(12) United States Patent
Zeng (10) Patent No.: US 10,703,230 B2
(45) Date of Patent: Jul. 7, 2020

(54) CHILD SAFETY RESTRAINT SYSTEM

(71) Applicant: Guangzhou Zhuiqu Industrial Co., Ltd., Guangzhou (CN)

(72) Inventor: Hui Zeng, Guangzhou (CN)

(\*) Notice: Subject to any disclaimer, the term of this patent is extended or adjusted under 35 U.S.C. 154(b) by 0 days.

(21) Appl. No.: 16/705,272

(22) Filed: Dec. 6, 2019

(65) Prior Publication Data

US 2020/0108741 A1 Apr. 9, 2020

(30) Foreign Application Priority Data

Jul. 8, 2019 (CN) .......................... 2019 1 0610791

(51) Int. Cl.
*B60N 2/28* (2006.01)
*B60R 22/10* (2006.01)

(52) U.S. Cl.
CPC ......... *B60N 2/2839* (2013.01); *B60N 2/2884* (2013.01); *B60R 22/105* (2013.01)

(58) Field of Classification Search
CPC .. B60N 2/2839; B60N 2/2884; B60N 2/2806; B60R 22/105; A47C 4/54
USPC .......................... 297/488, 250.1, 452.41, 253
See application file for complete search history.

(56) References Cited

U.S. PATENT DOCUMENTS

| | | | | |
|---|---|---|---|---|
| 2,150,434 A | * | 3/1939 | Finlay | A47C 4/54 297/452.41 |
| 3,265,438 A | * | 8/1966 | Regan | A47C 4/54 297/452.41 |
| 4,711,490 A | * | 12/1987 | Brand | B60N 2/2806 297/250.1 |
| 6,179,383 B1 | * | 1/2001 | Ochi | A47C 4/54 297/250.1 |
| 7,131,701 B1 | * | 11/2006 | Yang | A47C 4/54 297/452.41 |
| 2004/0227384 A1 | | 11/2004 | Smallwood et al. | |
| 2005/0099054 A1 | * | 5/2005 | McCarthy | A47C 15/006 297/452.41 |
| 2007/0085394 A1 | * | 4/2007 | Yang | B60N 2/914 297/250.1 |
| 2008/0136225 A1 | | 6/2008 | Murphy | |

(Continued)

FOREIGN PATENT DOCUMENTS

CN 104129328 A \* 11/2014

*Primary Examiner* — Milton Nelson, Jr.
(74) *Attorney, Agent, or Firm* — HYIP (57) ABSTRACT

The child safety restraint system comprises a seat main part which is a segmented inflatable airbag seat including a cushion-backrest integrated part in the middle and armrest-head guard integrated parts on two sides, wherein the cushion-backrest integrated part is formed by wrapping a cushion-backrest integrated airbag with a cushion-backrest integrated fabric, and the armrest-head guard integrated parts are formed by wrapping armrest-head guard integrated airbags with armrest-head guard integrated fabrics; head guard segments of the armrest-head guard integrated parts are able to shield against glass fragments splashed into a car when window glass is hit laterally; the cushion-backrest integrated part and the armrest-head guard integrated parts are provided with inflation-deflation valves; and car safety-belt fasteners are arranged between armrest segments and the head guard segments of the armrest-head guard integrated parts. A safety seat comprises a shoulder-type elliptical annular front protection body.

10 Claims, 12 Drawing Sheets

(56) References Cited

U.S. PATENT DOCUMENTS

2010/0244517 A1  9/2010  Britton
2012/0242128 A1* 9/2012  Wessman ............. B60N 2/2806
                                              297/250.1

* cited by examiner

CHILD SAFETY RESTRAINT SYSTEM

BACKGROUND OF THE INVENTION

Technical Field

The invention relates to the technical field of car safety seats, in particular to a child safety restraint system.

Description of Related Art

The number of private cars is increasing accompanied with the rapid improvement of people's living standards. However, there are still severe hidden dangers in the aspect of child safety. If children sit in a car alone, they will be thrown forwards during an emergency brake and will be seriously injured or even die due to automotive glass fragments and the like. Even if the children are held in arms by their parents, they cannot be protected by their parents in time. Due to the weak bones, slow response, and poor support strength of children, they are unable to successfully resolve various small dangers which can be resolved by adults, this is another reason why children are more likely to be injured when taking a car. Thus, children safety seats are indispensable. According to the US traffic accident statistics, by adoption of children safety restraint devices, children injury accidents can be decreased by 71%. Besides, according to the report of the World Health Organization, for every 10% increase of the usage proportion of the safety restraint devices, the probability of fatal injuries to children will be decreased by 35%.

At present, child safety seats on the market are generally formed by a wooden or plastic frame and a cushion sleeved with sponge flannelette and matched with the frame, such child seats adopting the wooden or plastic frame are hard and uncomfortable, and cannot be folded or contracted, thus occupying a large space and being inconvenient to transport and carry. Children under the protection of such child seats have the risk of being forwards thrown or intensively shocked at the collision moment of accidents, and the shoulders and front part of the children cannot be effectively protected.

BRIEF SUMMARY OF THE INVENTION

The invention provides a child safety restraint system, which is tied to a car seat to allow children to sit thereon, has a restraint device capable of restraining the children to furthest ensure child safety during a car accident, and can furthest and comprehensively protect the children against injuries through buffering and pressure reduction of an airbag and an air outlet of a seat main part.

The technical solution of the invention is as follows:

A child safety restraint system comprises a seat main part, wherein:

The seat main part is a segmented inflatable airbag seat 2;

The segmented inflatable airbag seat 2 includes a cushion-backrest integrated part 4 in the middle and armrest-head guard integrated parts 3 on two sides;

The cushion-backrest integrated part 4 is formed by wrapping a cushion-backrest integrated airbag with a cushion-backrest integrated fabric, and the armrest-head guard integrated parts 3 are formed by wrapping armrest-head guard integrated airbags with armrest-head guard integrated fabrics;

The cushion-backrest integrated part 4 in the middle and the armrest-head guard integrated parts 3 on the two sides are connected through the cushion-backrest integrated fabric and the armrest-head guard integrated fabrics by high-frequency welding to form a seat shape;

The cushion-backrest integrated part 4 includes a cushion segment and a backrest segment, and each armrest-head guard integrated part includes an armrest segment and a head guard segment;

The head guard segments of the armrest-head guard integrated parts 3 are able to shield against objects or glass fragments splashed into a car when window glass is hit laterally;

The cushion-backrest integrated part 4 and the armrest-head guard integrated parts 3 are provided with inflation-deflation valves; and Car safety belt fasteners 15 are arranged between the armrest segments and the head guard segments of the armrest-head guard integrated parts 3.

Preferably, the cushion-backrest integrated part 4 is formed by two L-shaped fabrics having an L-shaped airbag wrapped therein;

Each armrest-head guard integrated part 3 is formed by two L-shaped fabrics having an L-shaped airbag wrapped therein; and An angle is formed between the L-shaped fabrics and the L-shaped airbags and is 85°-130°.

Furthermore, a safety seat comprises a shoulder-type elliptical annular front protection body 1 which is made from soft materials and has an upper end connected with the top of the backrest segment of the cushion-backrest integrated part 4 through a first connector 12 as well as a lower end connected with the front part of the cushion segment of the cushion-backrest integrated part 4 through a second connector 13;

A bending angle is formed between the upper segment and the lower segment of the front protection body 1 and is 150°-165°; and The head of a user passes through the shoulder-type elliptical annular front protection body 1, the bending angle is closely attached to the shoulders of the user to protect the shoulders, the upper segment of the front protection body 1 is closely attached to the back of the head of the user to protect the head, and the lower segment of the front protection body 1 is closely attached to the chest of the user to protect the chest.

Preferably, the first connector 12 is a hook and loop fastener arranged at the upper end of the front protection body 1 and matched with the top of the backrest segment of the cushion-backrest integrated part 4, and the second connector 13 is a braid fastener arranged at the lower end of the front protection body 1 and matched with the front part of the cushion segment of the cushion-backrest integrated part 4.

Preferably, the first connector 12 is a fastener arranged at the upper end of the front protection body 1 and matched with the top of the backrest segment of the cushion-backrest integrated part 4, and the second connector 13 is a braid flat-pressing fastener 17 arranged at the lower end of the front protection body 1 and matched with the front part of the cushion segment of the cushion-backrest integrated part 4.

Furthermore, the shoulder-type elliptical annular front protection body 1 is an inflatable-airbag shoulder-type elliptical annular front protection body provided with an inflation-deflation valve;

Furthermore, the inflatable-airbag shoulder-type elliptical annular front protection body is formed by two elliptical annular fabrics through high-frequency welding, and an elliptical annular airbag is wrapped in the two elliptical annular fabrics;

An internal ring 8 is arranged at an internal weld joint of the two elliptical annular fabrics, and a skirt 9 is arranged at an external weld joint of the two annular fabrics;

The internal diameter of the internal ring 8 is gradually decreased from top to bottom; and The elliptical annular airbag swells in the elliptical annular fabrics after being inflated; and the fabrics are elliptical and annular, the internal rings becomes narrow gradually from top to bottom, the internal diameter of a circular ring of the inflated elliptical annular airbag is gradually decreased from top to bottom, and the internal ring 8 limits the elliptical annular airbag from being further swelling towards the internal ring, so that the bending angle is naturally generated between the upper segment and the lower segment of the inflatable-airbag shoulder-type elliptical annular front protection body 1 after inflation and is located on an upper part.

Preferably, openings 19 are formed in two sides between the cushion segment and the backrest segment of the cushion-backrest integrated part 4, and an ISOFIX standard belt 20 penetrates through the openings 19 to be connected and fixed to ISOFIX ports of a car to fix the seat main part; and A LATCH standard braid having a hook is connected with a top 14 of the backrest segment of the cushion-backrest integrated part 4, and is wound across a shoulder part of a car seat to be hooked on a LATCH port to fix the seat main part.

Preferably, an air outlet 18 is formed in one side of the front part of the cushion segment of the cushion-backrest integrated part 4 and is used for rapidly exhausting air in the cushion-backrest integrated part 4 when a local pressure at the air outlet 18 is increased instantaneously.

Preferably, the fabrics are PVC or TPU composite fabrics.

By adopting the technical solution, the invention has the following beneficial effects:

1. The child safety restraint system is a car child safety seat after being inflated, and children sitting on the safety seat and the safety seat are fixed to a car seat by means of a safety belt, penetrating through the car safety belt fasteners, of a car.

2. The seat main part is of a segmented inflatable airbag structure, thus being easy to shape, practical, attractive, and vivid; that is to say, by adoption of the segmented inflatable airbag structure, the seat main part can be shaped easily as the safety seat, and is convenient to store and occupies little space after being deflated, thus solving the technical problem that a safety seat which is of a single airbag structure cannot be shaped as a standard safety seat. Besides, the seat main part of the inflatable airbag structure can reduce (relieve) the pressure, generated due to the impact of an external force, of a car, thus effectively protecting children.

3. Each armrest-head guard integrated part includes the armrest segment and the head guard segment. The head guard segments of the armrest-head guard integrated parts are able to shield against glass fragments splashed into the car when the window glass is hit laterally, so that the most vulnerable body part of children is effectively protected.

4. The cushion-backrest integrated part is formed by wrapping the L-shaped airbag with the two L-shaped fabrics, and each armrest-head guard integrated part is formed by wrapping the L-shaped airbag with the two L-shaped fabrics, so that the airbags can be shaped as the standard safety seat after being inflated.

5. The bending angle is formed between the upper segment and the lower segment of the front protection body 1 and is 150°-165°. Through the design of the bending angle, users can stretch their hands out of the front protection body without being shielded.

6. The head of the user passes through the shoulder-type elliptical annular front protection body 1, the users stretch their hands to stretch out of the internal ring of the front protection body without being shielded, the bending angle is closely attached to the shoulders of the users to protect the shoulders, the upper segment of the front protection body 1 is closely attached to the back of the head of the users to protect the head, and the lower segment of the front protection body 1 is closely attached to the chest of the users to protect the chest. Thus, the shoulder-type elliptical annular front protection body can comprehensively protect the main body parts, most likely to be injured due to a car collision, of children.

6. The elliptical annular airbag swells in the elliptical annular fabrics after being inflated; and the fabrics are elliptical and annular, the internal rings becomes narrow gradually from top to bottom, the internal diameter of the circular ring of the inflated elliptical annular airbag is gradually decreased from top to bottom, and the internal ring 8 limits the elliptical annular airbag from being further swelling towards the internal ring, so that the bending angle is naturally generated between the upper segment and the lower segment of the inflatable-airbag shoulder-type elliptical annular front protection body 1 after inflation in the absence of an internal retractable belt or an external support structure (namely a natural bending phenomenon) and is located on an upper part. However, if existing inflatable products need to be bent, an internal retractable belt or a support structure formed by more than three materials needs to be configured.

7. Compared with a soft material, the front protection body 1 which is of an inflatable airbag structure can further reduce (relieve) the pressure, generated due to the impact of an external force, of a car, thus being capable of protecting children more effectively.

8. The openings 19 are formed in the two sides between the cushion segment and the backrest segment of the cushion-backrest integrated part 4, and the ISOFIX standard belt 20 penetrates through the openings 19 to be connected and fixed to the ISOFIX ports of a car to fix the seat main part to the car seat more firmly, a LATCH standard braid having a hook is connected with a top 14 of the backrest segment of the cushion-backrest integrated part 4, and is wound across a shoulder part of the car seat to be hooked on the LATCH port to fix the seat main part. That is to say, the child safety restraint system supports three standard fixing manners: a European standard ISOFIX fixing manner, an American standard LATCH fixing manner, and a safety belt fixing manner.

9. The air outlet 18 is formed in one side of the front part of the cushion segment of the cushion-backrest integrated part 4; and the local pressure at the air outlet 18 of the child safety restraint system will be instantaneously increased during a car collision, and when a pressure point reaches a set value, the air outlet will be triggered to rapidly exhaust air to greatly reduce a forward impact force, so that the children are further protected effectively.

10. The fabrics are PVC or TPU composite fabrics which are more skin-friendly and comfortable.

For the sake of a clearer explanation of the technical solutions of the embodiments of the invention or the prior art, a brief description of the accompanying drawings required by the embodiments is given below. Clearly, the drawings in the following description are only used for illustrating certain embodiments of the invention, and those ordinarily skilled in the art can acquire other drawings according to the following ones without creative labor.

REFERENCE SIGNS

1, shoulder-type elliptical annular front protection body; 2, segmented inflatable airbag seat; 3, armrest-head guard integrated part; 30, armrest segment; 31, head guard segment; 4, cushion-backrest integrated part; 40, cushion segment; 5, backrest segment; 6/11, inflation-deflation valve; 8, internal ring; 9, skirt; 12, first connector; 13, second connector; 14, top; 15, car safety belt fastener; 16, pressing portion; 17, braid flat-pressing fastener; 18, air outlet; 19, opening; 20, ISOFIX standard belt.

DETAILED DESCRIPTION OF THE INVENTION

The technical solutions of the embodiments of the invention are clearly and completely described as follows in combination with the accompanying drawings. Clearly, the embodiments in the following description are only illustrative ones, and are not all possible ones of the invention. On the basis of the embodiments in the invention, all other embodiments obtained by those ordinarily skilled in this field without creative labor should also fall within the protection scope of the invention.

Figure 4:
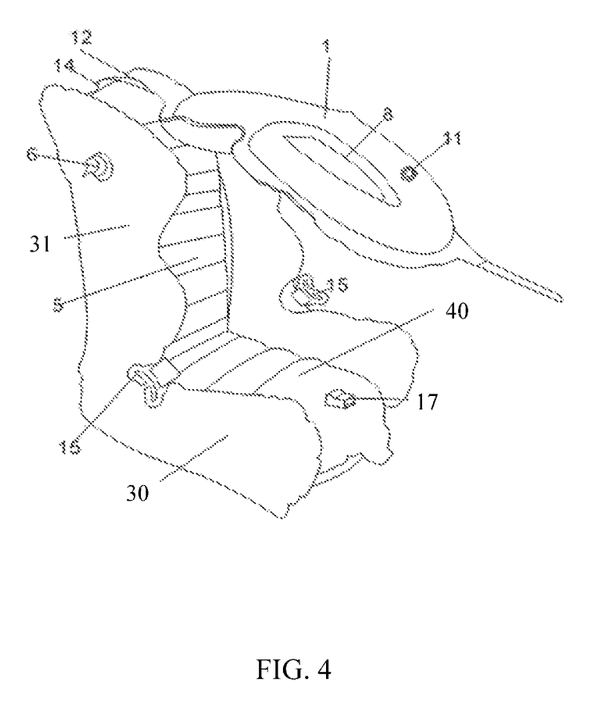
FIG. 4 is a connection diagram of the upper end of the front protection body and the backrest segment of a cushion-backrest integrated part.
Figure 5:
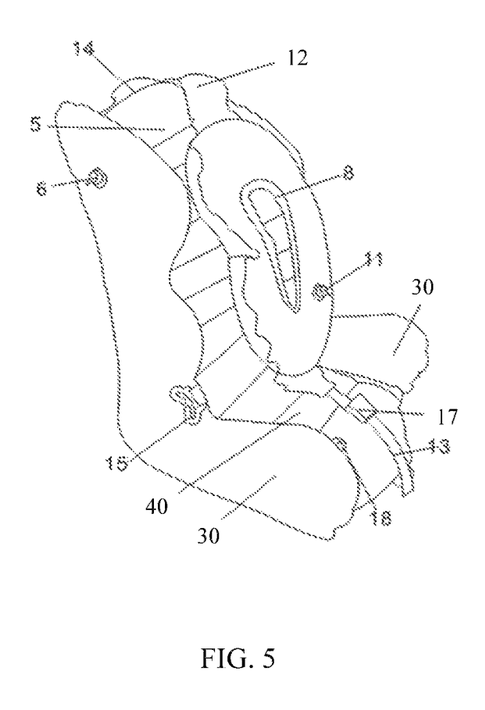
FIG. 5 is a connection diagram of the front protection body and the cushion-backrest integrated part.
Figure 6:
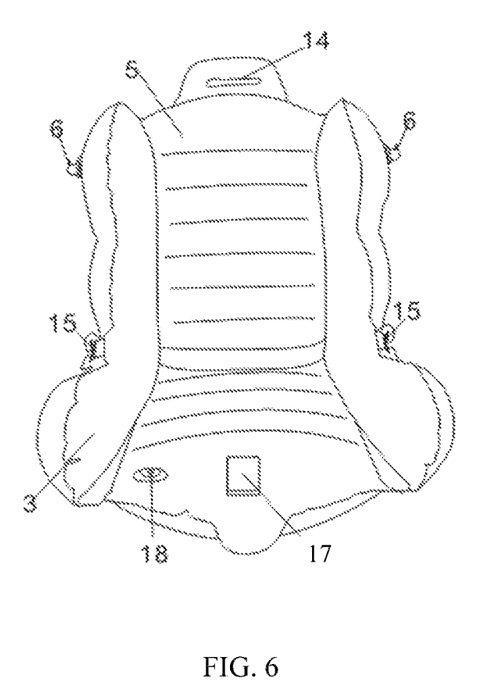
FIG. 6 is a schematic diagram of a segmented inflatable airbag seat.

As shown in FIG. 4 to FIG. 6, a child safety restraint system comprises a seat main part which is a segmented inflatable airbag seat 2;

The segmented inflatable airbag seat 2 includes a cushion-backrest integrated part 4 in the middle and armrest-head guard integrated parts 3 on two sides;

The cushion-backrest integrated part 4 is formed by wrapping a cushion-backrest integrated airbag with a cushion-backrest integrated fabric, and the armrest-head guard integrated parts 3 are formed by wrapping armrest-head guard integrated airbags with armrest-head guard integrated fabrics;

The cushion-backrest integrated part 4 in the middle and the armrest-head guard integrated parts 3 on the two sides are connected through the cushion-backrest integrated fabric and the armrest-head guard integrated fabrics by high-frequency welding to form a seat shape;

The cushion-backrest integrated part 4 includes a cushion segment 40 and a backrest segment 5, and each armrest-head guard integrated part 3 includes an armrest segment 30 and a head guard segment 31;

The head guard segments 31 of the armrest-head guard integrated parts 3 are able to shield against glass fragments splashed into a car when window glass is hit laterally;

The cushion-backrest integrated part 4 and the armrest-head guard integrated parts 3 are provided with inflation-deflation valves 6; and Car safety belt fasteners 15 are arranged between the armrest segments 30 and the head guard segments 31 of the armrest-head guard integrated parts 3.

According to the invention, the child safety restraint system is a car child safety seat after being inflated, and children sitting on the safety seat and the safety seat are fixed to a car seat by means of a safety belt, penetrating through the car safety belt fasteners, of a car.

The seat main part is of a segmented inflatable airbag structure, thus being easy to shape, practical, attractive, and vivid; that is to say, by adoption of the segmented inflatable airbag structure, the seat main part can be shaped as the safety seat easily, and is convenient to store and occupies little space after being deflated, thus solving the technical problem that a safety seat which is of a single airbag structure cannot be shaped as a standard safety seat. Besides, the seat main part of the inflatable airbag structure can reduce (relieve) the pressure, generated due to the impact of an external force, of a car, thus effectively protecting children.

Each armrest-head guard integrated part includes the armrest segment and the head guard segment. The head guard segments of the armrest-head guard integrated parts are able to shield against glass fragments splashed into the car when the window glass is hit laterally, so that the most vulnerable body part of children is effectively protected.

As shown in FIG. 4 to FIG. 6, the cushion-backrest integrated part 4 is formed by two L-shaped fabrics having an L-shaped airbag wrapped therein;

Each armrest-head guard integrated part 3 is formed by two L-shaped fabrics having an L-shaped airbag wrapped therein; and An angle is formed between the L-shaped fabrics and the L-shaped airbags and is 85°-130°. The angle is preferably 95°-110°, and in this case, the seat is most comfortable.

The cushion-backrest integrated part is formed by wrapping the L-shaped airbag with the two L-shaped fabrics, and each armrest-head guard integrated part is formed by wrapping the L-shaped airbag with the two L-shaped fabrics, so that the airbags can be shaped as the standard safety seat after being inflated.

As shown in FIG. 1 to FIG. 8, the safety seat comprises a shoulder-type elliptical annular front protection body 1 which is made from soft materials and has an upper end connected with the top of the backrest segment of the cushion-backrest integrated part 4 through a first connector 12 as well as a lower end connected with the front part of the cushion segment of the cushion-backrest integrated part 4 through a second connector 13; and The bending angle is formed between an upper segment and a lower segment of the front protection body 1 and is 150°-165°. Through the design of the bending angle, users can stretch their hands out of the front protection body without being shielded.

Figure 1:
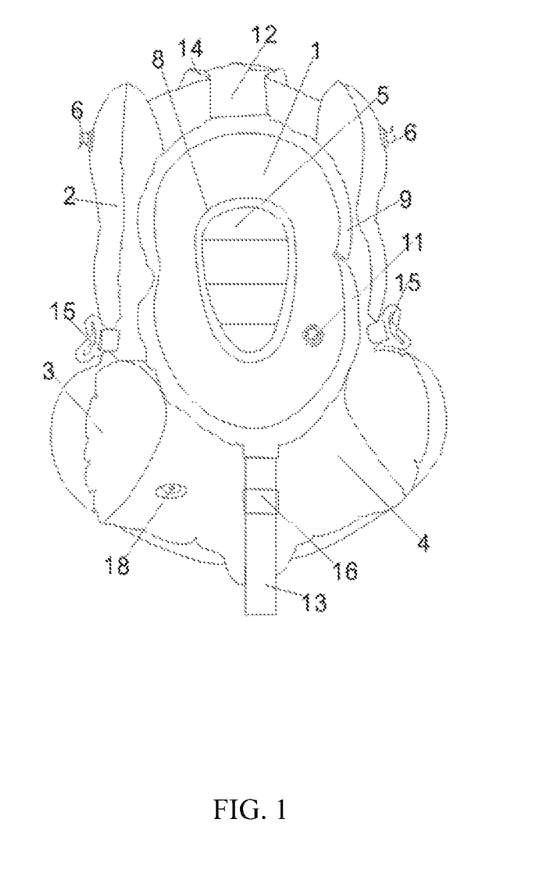
FIG. 1 is an overall structural view.

The head of the users pass through the shoulder-type elliptical annular front protection body 1, the users stretch their hands out of the internal ring of the front protection body without being shielded, the bending angle is closely attached to the shoulders of the users to protect the shoulders, the upper segment of the front protection body 1 is closely attached to the back of the head of the users to protect the head, and the lower segment of the front protection body 1 is closely attached to the chest of the users to protect the chest. Thus, the shoulder-type elliptical annular front protection body can comprehensively protect the main body parts, most likely to be injured due to a car collision, of children.

For the sake of convenient assembly, the first connector 12 is a hook and loop fastener arranged at the upper end of the front protection body 1 and matched with the top of the backrest segment of the cushion-backrest integrated part 4, and the second connector 13 is a braid fastener arranged at the lower end of the front protection body 1 and matched with the front part of the cushion segment of the cushion-backrest integrated part 4.

Figure 10:
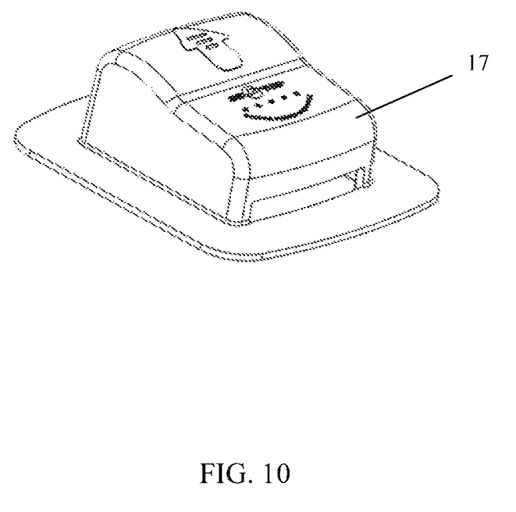
FIG. 10 is a structural view of an accessory: braid flat-pressing fastener.
Figure 11:
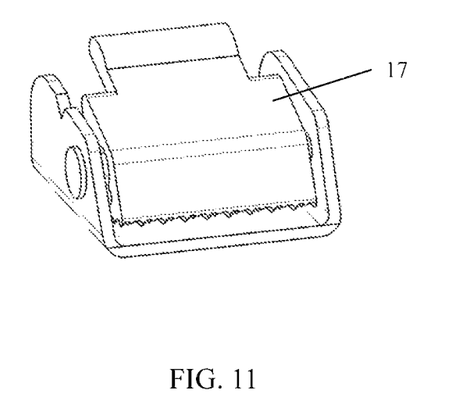
FIG. 11 is a separation diagram of a metal part and a soft rubber of the accessory: braid flat-pressing fastener.

For the sake of convenient assembly, the first connector 12 is a fastener arranged at the upper end of the front protection body 1 and matched with the top of the backrest segment of the cushion-backrest integrated part 4, and the second connector 13 is a braid flat-pressing fastener 17 arranged at the lower end of the front protection body 1 and matched with the front part of the cushion segment of the cushion-backrest integrated part 4.

Figure 2:
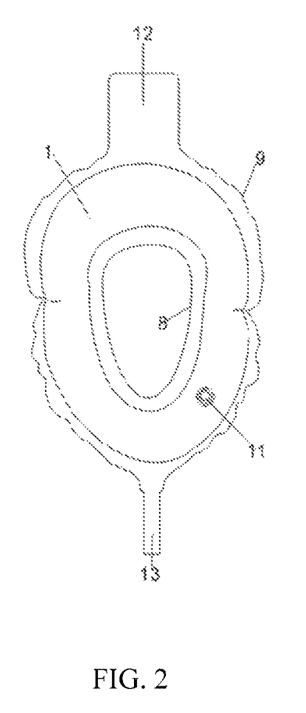
FIG. 2 is a structural view of a front protection body.
Figure 3:
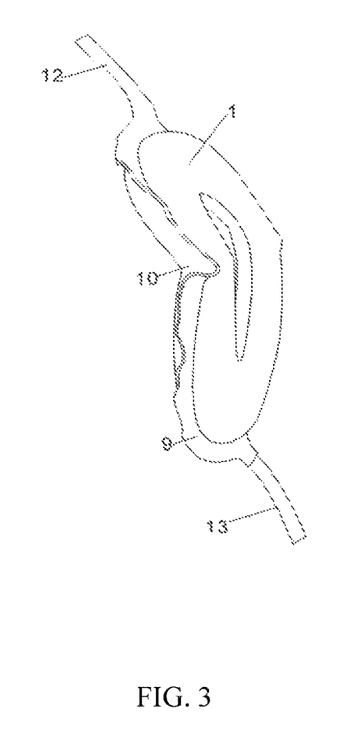
FIG. 3 is a schematic diagram of the front protection body in a naturally bent state after being inflated.

As shown in FIG. 2 to FIG. 4, the shoulder-type elliptical annular front protection body 1 is an inflatable-airbag shoulder-type elliptical annular front protection body provided with an inflation-deflation valve 11.

Furthermore, the inflatable-airbag shoulder-type elliptical annular front protection body is formed by two elliptical annular fabrics through high-frequency welding, and an elliptical annular airbag is wrapped in the two elliptical annular fabrics;

An internal ring 8 is arranged at an internal weld joint of the two elliptical annular fabrics, and a skirt 9 is arranged at an external weld joint of the two elliptical annular fabrics;

The internal diameter of the internal ring 8 is gradually decreased from top to bottom; and The elliptical annular airbag swells in the elliptical annular fabrics after being inflated; and the fabrics are elliptical and annular, the internal ring becomes narrow gradually from top to bottom, the internal diameter of the circular ring of the inflated elliptical annular airbag is gradually decreased from top to bottom, and the internal ring 8 can limit the elliptical annular airbag from further swelling towards the internal ring, so that the bending angle is naturally generated between the upper segment and the lower segment of the inflatable-airbag shoulder-type elliptical annular front protection body 1 after inflation in the absence of an internal retractable belt or an external support structure (namely a natural bending phenomenon) and is located on the upper part. However, if existing inflatable products need to be bent, an internal retractable belt or a support structure formed by more than three materials needs to be configured.

Compared with a soft material, the front protection body 1 which is of an inflatable airbag structure can further reduce (relieve) the pressure, generated due to the impact of an external force, of a car, thus being capable of protecting children more effectively.

Figure 7:
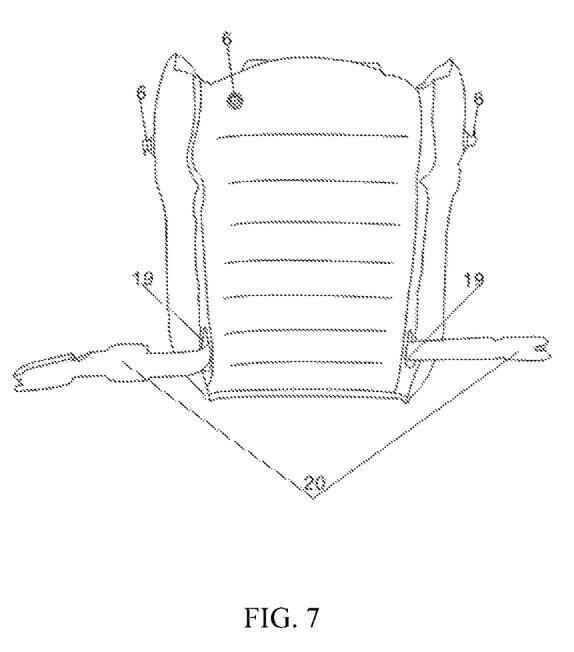
FIG. 7 is schematic diagram of an ISOFIX standard belt penetrating through openings.

As shown in FIG. 7, openings 19 are formed in two sides between the cushion segment and the backrest segment of the cushion-backrest integrated part 4, and an ISOFIX standard belt 20 penetrates through the openings 19 to be connected and fixed to ISOFIX ports of a car to fix the seat main part to the car seat more firmly; and A LATCH standard braid having a hook is connected with a top 14 of the backrest segment of the cushion-backrest integrated part 4, and is wound across a shoulder part of the car seat to be hooked on a LATCH port to fix the seat main part.

That is to say, the child safety restraint system supports three standard fixing manners: a European standard ISOFIX fixing manner, an American standard LATCH fixing manner, and a safety belt fixing manner.

Figure 8:
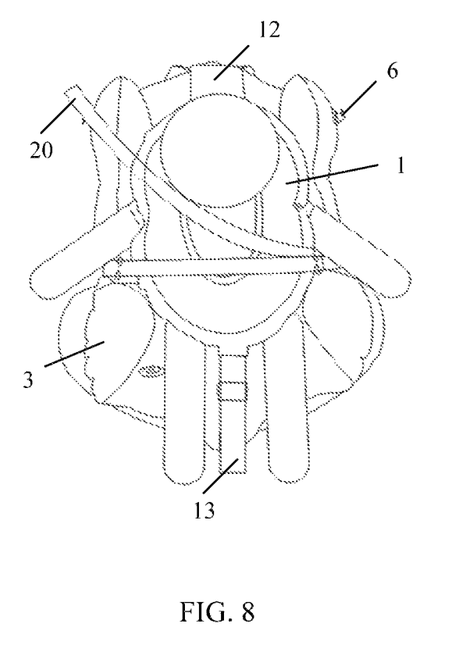
FIG. 8 is a front view of a child safety restraint system having a child sit thereon and be fastened with a safety belt.
Figure 9:
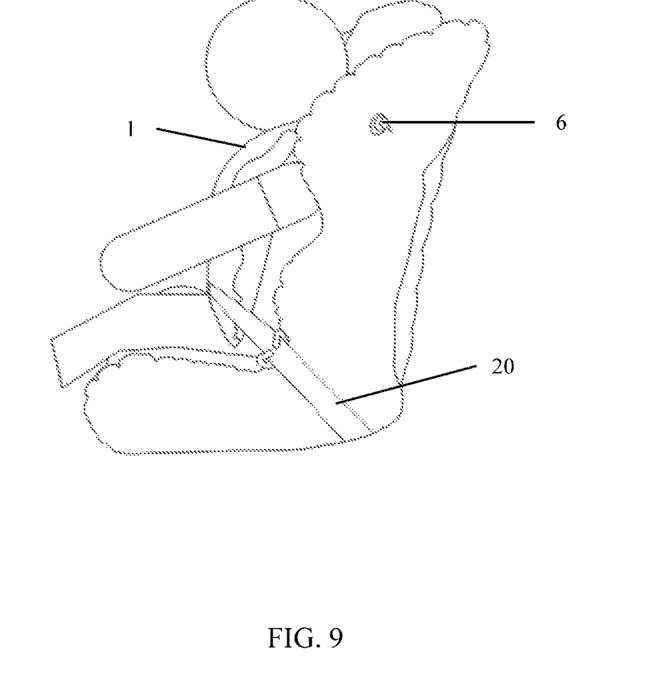
FIG. 9 is a side view of the child safety restraint system having the child sit thereon and be fastened with the safety belt.

As shown in FIG. 8, an air outlet 18 is formed in one side of the front part of the cushion segment of the cushion-backrest integrated part 4 and is used for rapidly exhausting air in the cushion-backrest integrated part 4 when the local pressure at the air outlet 18 is increased instantaneously.

Figure 12:
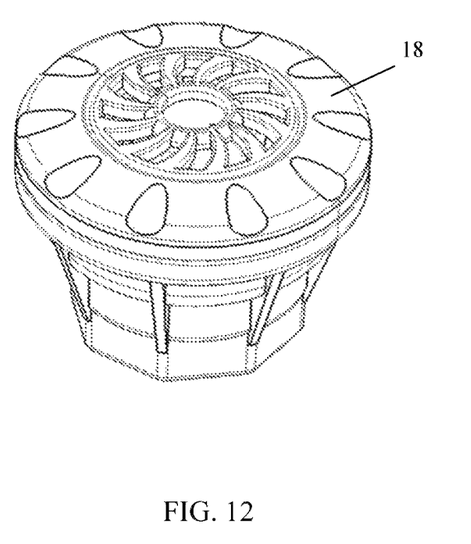
FIG. 12 is a structural view of an accessory: air outlet.

The local pressure at the air outlet 18 of the child safety restraint system will be instantaneously increased during a car collision, and when a pressure point reaches a set value, the air outlet will be triggered to rapidly exhaust air to greatly reduce a forward impact force, so that the children are further protected effectively.

Preferably, the fabrics are PVC or TPU composite fabrics which are more skin-friendly and comfortable.

The above embodiments are only preferred ones of the invention, and are not intended to limit the invention. Any modifications, equivalent substitutes, improvements, and upgrades achieved based on the spirit and principle of the invention should also fall within the protection scope of the invention.

What is claimed is:

1. A child safety restraint system, comprising a seat main part, wherein:
    the seat main part is a segmented inflatable airbag seat;
    the segmented inflatable airbag seat includes a cushion-backrest integrated part in a middle and armrest-head guard integrated parts on two sides;
    the cushion-backrest integrated part is formed by wrapping a cushion-backrest integrated airbag with a cushion-backrest integrated fabric, and the armrest-head guard integrated parts are formed by wrapping armrest-head guard integrated airbags with armrest-head guard integrated fabrics;
    the cushion-backrest integrated part in the middle and the armrest-head guard integrated parts on the two sides are connected through the cushion-backrest integrated fabric and the armrest-head guard integrated fabrics by high-frequency welding to form a seat shape;
    the cushion-backrest integrated part includes a cushion segment and a backrest segment, and each said armrest-head guard integrated part includes an armrest segment and a head guard segment;
    the head guard segments of the armrest-head guard integrated parts are able to shield against glass fragments splashed into a car when window glass is hit laterally;
    the cushion-backrest integrated part and the armrest-head guard integrated parts are provided with inflation-deflation valves; and car safety belt fasteners are arranged between the armrest segments and the head guard segments of the armrest-head guard integrated parts.

2. The child safety restraint system according to claim 1, wherein:
the cushion-backrest integrated fabric includes two L-shaped fabrics, and the cushion-backrest integrated airbag is an L-shaped airbag;
each said armrest-head guard integrated fabric include two L-shaped fabrics, and each armrest-head guard integrated airbag is an L-shaped airbag; and
an angle is formed between the L-shaped fabrics and the L-shaped airbags and is 85°-130°.

3. The child safety restraint system according to claim 1, comprising: a shoulder-type elliptical annular front protection body which is made from soft materials and has an upper end connected with a top of the backrest segment of the cushion-backrest integrated part through a first connector as well as a lower end connected with a front part of the cushion segment of the cushion-backrest integrated part through a second connector;
wherein: a bending angle is formed between an upper segment and a lower segment of the front protection body and is 150°-165°; and
the shoulder-type elliptical annular front protection body is configured to allow a head of a user to pass therethrough, the bending angle is capable of being closely attached to shoulders of the user to protect the shoulders, an upper segment of the front protection body is capable of being closely attached to a back of the head of the user to protect the head, and a lower segment of the front protection body is capable of being closely attached to the chest of the user to protect the chest.

4. The child safety restraint system according to claim 3, wherein the first connector is a hook and loop fastener arranged at the upper end of the front protection body and matched with the top of the backrest segment of the cushion-backrest integrated part, and the second connector is a braid fastener arranged at the lower end of the front protection body and matched with the front part of the cushion segment of the cushion-backrest integrated part.

5. The child safety restraint system according to claim 3, wherein the first connector is a fastener arranged at the upper end of the front protection body and matched with the top of the backrest segment of the cushion-backrest integrated part, and the second connector is a braid flat-pressing fastener arranged at the lower end of the front protection body and matched with the front part of the cushion segment of the cushion-backrest integrated part.

6. The child safety restraint system according to claim 3, wherein the shoulder-type elliptical annular front protection body is an inflatable-airbag shoulder-type elliptical annular front protection body provided with an inflation-deflation valve.

7. The child safety restraint system according to claim 6, wherein:
the inflatable-airbag shoulder-type elliptical annular front protection body is formed by two elliptical annular fabrics through high-frequency welding, and an elliptical annular airbag is wrapped in the two elliptical annular fabrics;
an internal ring is arranged at an internal weld joint of the two elliptical annular fabrics, and a skirt is arranged at an external weld joint of the two annular fabrics;
an internal diameter of the internal ring is gradually decreased from top to bottom; and
the elliptical annular airbag swells in the elliptical annular fabrics after being inflated; and the fabrics are elliptical and annular, the internal ring becomes narrow gradually from top to bottom, an internal diameter of a circular ring of the inflated elliptical annular airbag is gradually decreased from top to bottom, and the internal ring limits the elliptical annular airbag from further swelling towards the internal ring, so that the bending angle is naturally generated between the upper segment and the lower segment of the inflatable-airbag shoulder-type elliptical annular front protection body after inflation and is located on an upper part.

8. The child safety restraint system according to claim 1, wherein:
openings are formed in two sides between the cushion segment and the backrest segment of the cushion-backrest integrated part, and an ISOFIX standard belt penetrates through the openings to be connected and fixed to ISOFIX ports of a car to fix the seat main part; and
a LATCH standard braid having a hook is connected with a top of the backrest segment of the cushion-backrest integrated part, and is wound across a shoulder part of a car seat to be hooked on a LATCH port to fix the seat main part.

9. The child safety restraint system according to claim 1, wherein an air outlet is formed in one side of a front part of the cushion segment of the cushion-backrest integrated part and is used for rapidly exhausting air in the cushion-backrest integrated part when a local pressure at the air outlet is increased instantaneously.

10. The child safety restraint system according to claim 1, wherein the fabrics are PVC or TPU composite fabrics.

* * * * *